(12) United States Patent
Yamamura

(10) Patent No.: US 7,024,659 B2
(45) Date of Patent: Apr. 4, 2006

(54) GRAPHIC DISPLAY OF CONFIGURATION INFORMATION AND OF FURTHER DEVICE COMPONENTS REQUIRED

(75) Inventor: Shinichi Yamamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 751 days.

(21) Appl. No.: 10/119,352

(22) Filed: Apr. 9, 2002

(65) Prior Publication Data

US 2002/0158907 A1   Oct. 31, 2002

(30) Foreign Application Priority Data

Apr. 16, 2001 (JP) ............................. 2001-116601
Mar. 25, 2002 (JP) ............................. 2002-083358

(51) Int. Cl.
    *G06F 9/44* (2006.01)

(52) U.S. Cl. .................................................... 717/121

(58) Field of Classification Search ........ 715/762–765, 715/962–968; 717/168–178, 120–122; 705/26–29, 705/410–411
See application file for complete search history.

(56) References Cited

U.S. PATENT DOCUMENTS

| | | | |
|---|---|---|---|
| 6,067,582 A | * | 5/2000 | Smith et al. .................... 710/5 |
| 6,853,978 B1 | * | 2/2005 | Forth et al. ................... 705/26 |
| 2002/0133412 A1 | * | 9/2002 | Oliver et al. ................. 705/26 |

* cited by examiner

*Primary Examiner*—Wei Y. Zhen
*Assistant Examiner*—Mary Steelman
(74) *Attorney, Agent, or Firm*—Cowan, Liebowitz & Latman, P.C.

(57) ABSTRACT

In this information processing system, when a function that cannot be enabled in the current system configuration of a device is selected by a user on a setting window for setting various functions, control is performed to display information about a component required to enable the selected function. The system also performs control to obtain information about the component from a server. With the above arrangement, the information processing system can easily provide information about a component required to allow a device to enable the function selected by a user.

16 Claims, 9 Drawing Sheets

SELECT PAYMENT METHOD

⊙ TRANSFER IN CASH IN ADVANCE

○ CREDIT CARD

○ Dell Premium Plus CARD

○ QUICK LEASE

○ LEVEL UP LEASE

TO THE DETAIL PAYMENT METHOD

GRAPHIC DISPLAY OF CONFIGURATION INFORMATION AND OF FURTHER DEVICE COMPONENTS REQUIRED

BACKGROUND OF THE INVENTION

1. Field of the Invention

The present invention relates to the provision of information about a component required to enable a software function for a user when part of the function cannot be enabled due to lack of the component in setting the software function.

2. Related Background Art

There has been a conventional software installation scheme of installing optimized software in a system.

This scheme is aimed at preventing an information processing system from being stopped or malfunctioning when software that is not provided by a system apparatus is installed in the system.

As disclosed in Japanese Laid-Open Patent Application No. 5-173764, there has been an installation scheme of selecting software suitable for a system, optimizing the software, and installing it in the system by making one kind of software library comply with various types of systems even if the software library required changes due to changes of the application purpose of the information processing system and the specifications of an apparatus.

According to the above conventional software installation scheme based on apparatus configuration information, however, a user cannot know which function can be enabled by adding which option apparatus.

Assuming that a user wants to enhance part of the function of software installed in a computer such as a personal computer, the user must either directly inquire of a sales company about information concerning which apparatus should be purchased or obtain such information by self-help efforts. This causes inconvenience.

From the viewpoint of sales companies that sell merchandise, they have missed business opportunities.

SUMMARY OF THE INVENTION

The present invention has been made to solve the problem in the prior art described above, and has as its object to improve convenience and allows sales promotion.

In order to achieve the above object, according to the present invention, there is provided an information processing system comprising display means for displaying a setting window for setting functions to be executed by a device, determination means for determining, on the setting window, whether a function which can be enabled in a current system configuration of the device is selected by a user, and display control means for, when the determination means determines that a function which cannot be enabled in the current system configuration of the device is selected by the user, performing control to display information about a component required to enable the selected function.

In order to achieve the above object, according to another aspect the present invention, there is provided a server comprising reception means for receiving, from a client terminal, an inquiry about information about a component required to enable a function which cannot be enabled in a current system configuration of a device, and transmission means for transmitting the information about the component to the client terminal which has made the inquiry.

In order to achieve the above object, according to a further aspect of the present invention, there is provided an information processing method comprising the display step of displaying a setting window for setting functions to be executed by a device, the determination step of determining, on the setting window, whether a function which can be enabled in a current system configuration of the device is selected by a user, and the display control step of, when it is determined in the determination step that a function which cannot be enabled in the current system configuration of the device is selected by the user, performing control to display information about a component required to enable the selected function.

In order to achieve the above object, according to a still further aspect of the present invention, there is provided a server control method comprising the reception step of receiving, from a client terminal, an inquiry about information about a component required to enable a function which cannot be enabled in a current system configuration of a device, and the transmission step of transmitting the information about the component to the client terminal which has made the inquiry.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

A preferred embodiment of the present invention will be described in detail below with reference to the accompanying drawings. It should be noted that the sizes, materials, shapes, and relative positions of components described in this embodiment are not intended to restrict the scope of the present invention unless otherwise specified.

Although a business transaction system according to an embodiment of the present invention will be described below, a shop server, business transaction method, business transaction program, and storage medium according to the embodiment of the present invention will also be described.

A system according to an embodiment of the present invention will be described with reference to FIGS. 1 to 8.

Figure 1:
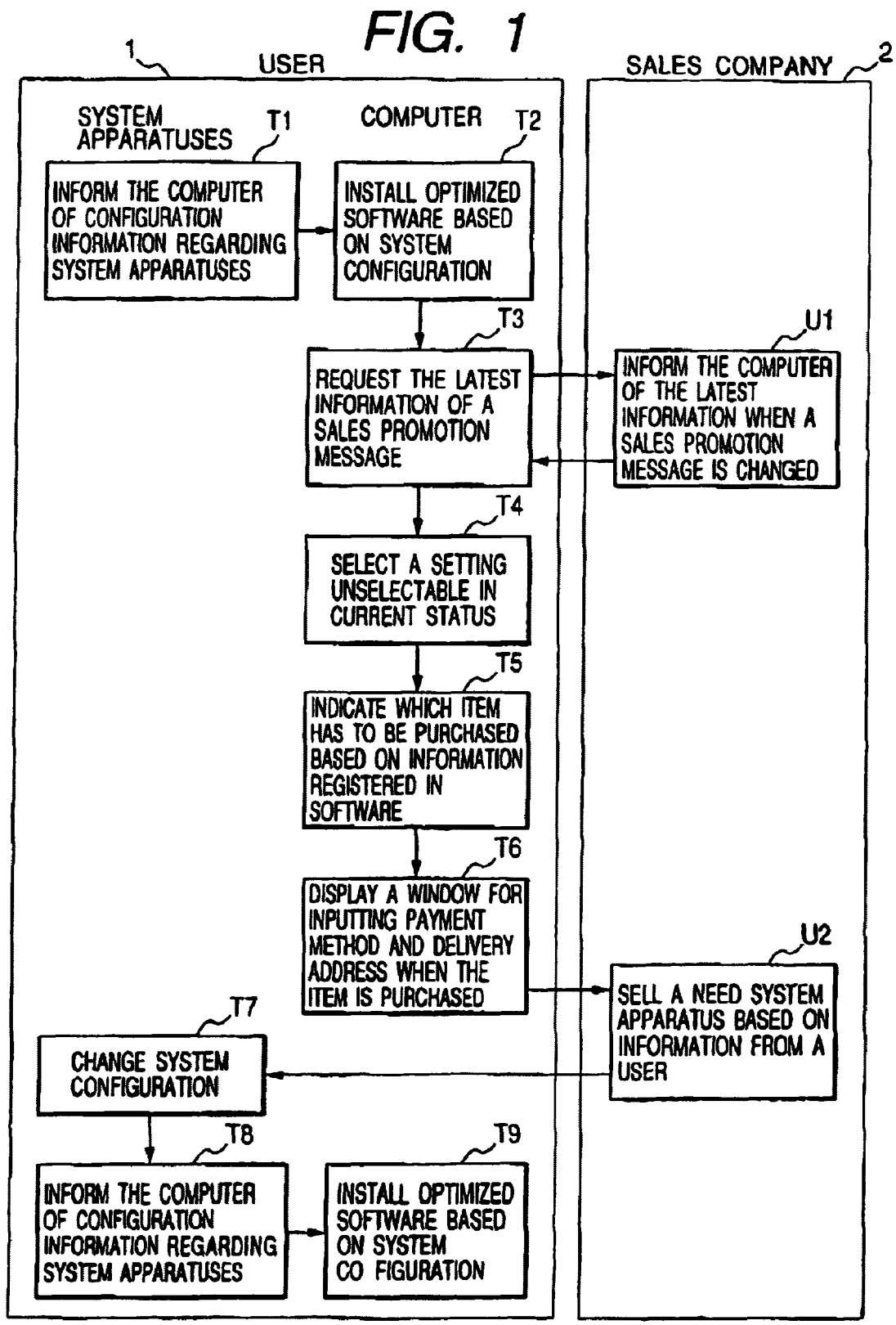
FIG. 1 is a sequence chart in a system according to an embodiment of the present invention.

The overall system will be described first with reference to FIG. 1. FIG. 1 is a sequence chart in a business transaction system according to an embodiment of the present invention.

As shown in FIG. 1, a client terminal 1 possessed by a user and a shop server 2 set in a sales company or the like are arranged to be accessible to each other through a network.

Note that the network may be the Internet, a public network, a cable TV network, a radio channel network, or a combination thereof. Assume that the network is the Internet in the following description.

In this case, the client terminal 1 includes a system apparatus and a computer for, for example, controlling the system apparatus.

Figure 5:
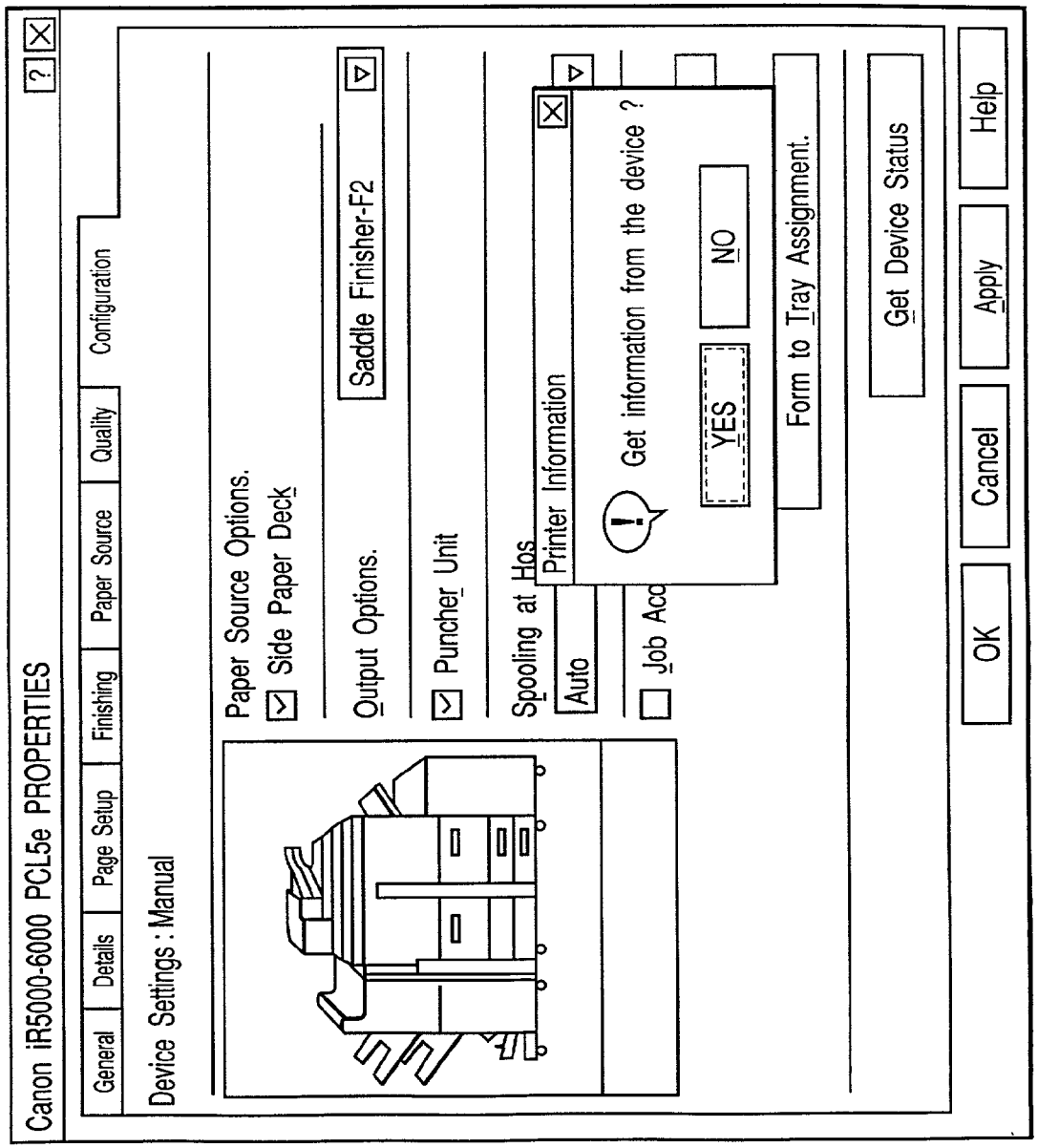
FIG. 5 is a view showing a display window to be displayed when the configuration information of a system apparatus is automatically obtained.

First of all, the system apparatus informs the computer of configuration information regarding the system apparatus (T1). At this time, the configuration of the system apparatus may be based on the information obtained from a device via the network or may be manually selected/input by the user. Note that in this embodiment, a printer apparatus will be exemplified as the system apparatus, as shown in FIG. 5. FIG. 5 shows a window to be displayed when "Get Device Status" is pressed by the user on the printer driver of the computer, and configuration information about the system apparatus (printer) is automatically obtained. At this time, the user sets information indicating whether an option apparatus such as a finisher for stapling or the like is added to the system apparatus.

Optimized software is installed in the computer on the basis of the system configuration information (T2).

When the installation of the software is completed in accordance with the system configuration, the software requests of the shop server 2 (the WWW site of the sales company), at regular intervals (or irregular intervals), the latest information of a message to be displayed for sales promotion as information regarding a component via the Internet (T3). In requesting this latest information, the computer transmits information about the devices currently added to the system apparatus to request the latest information about a device (component), that can be added to the system apparatus.

At this time, when the contents of the sales promotion message have been changed, the shop server 2 informs the latest information (U1). For example, the shop server 2 informs the latest information of an option device (e.g., an URL where the option device is introduced) that can be added to the system apparatus, price information, and campaign information.

The software (printer driver in this embodiment) installed in the computer automatically downloads the informed contents and registers them.

The intervals at which inquiries are made to the shop server 2 of the sales company via the Internet may be set to a proper number of days as a default (e.g., five days) and can be arbitrarily changed by the user.

In the software (printer driver in this embodiment) in which the system apparatus configuration is set, the functions that can be used in the current system apparatus configuration are determined, and the items of functions that cannot be used in the current system apparatus configuration are grayed out dimmed.

The computer than determines which one of the function items is selected by the user.

If it is determined that a function setting that cannot be used in the current system apparatus configuration (grayed-out function item) is selected by the user (T4), information about a component required to make the function available is read out and displayed on a display unit such as a display.

Information indicating which item should be purchased to make this function available is displayed on the basis of the information obtained from the shop server 2 and registered in step T3 (T5).

Figure 2:
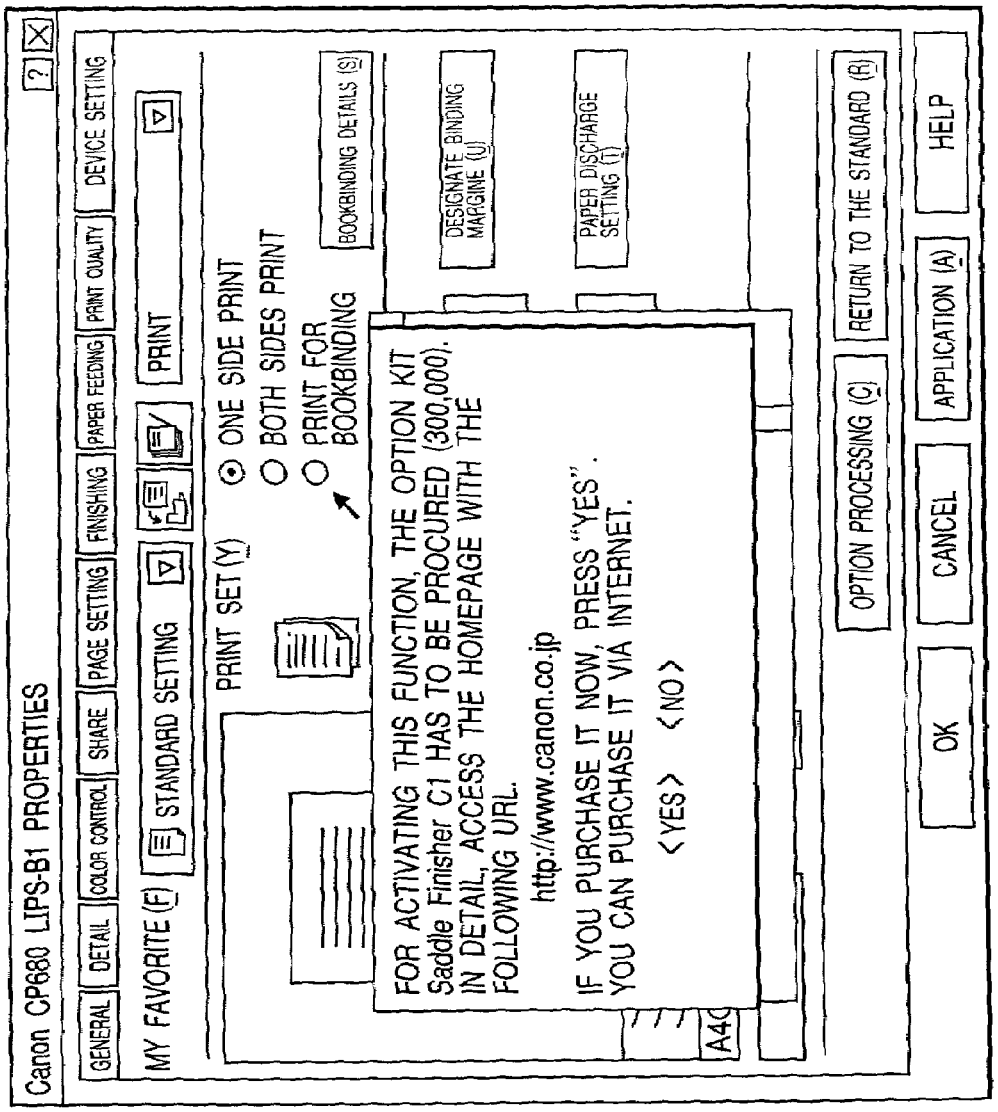
FIG. 2 is a view showing a display window to be displayed when a function that cannot be used in the system configuration is selected.

FIG. 2 shows an example of the information displayed on the display unit. FIG. 2 shows an example of the conflict message to be displayed when a function that cannot be used in the current system apparatus configuration is selected. In the embodiment shown in FIG. 2, this window is displayed when a Saddle Finisher is not installed in the current system configuration, and the user selects the function of "print for bookbinding". The window shows the price information of the Saddle Finisher required to execute the function of "print for bookbinding", the URL for browsing detailed product information, the button for placing an order, and the like.

In this case, the information displayed on the display unit includes, for example, the reason why this function cannot be used and information about a configuration required to make the function available.

As the information about the configuration, the name and price of the configuration, the URL for browsing more precise information, and the like are displayed. This information also includes, for example, order information that allows the user to order the article from the sales company using the client terminal 1 via the network.

More specifically, the contents displayed include the name, price, delivery date of the necessary option device and the like. At this time, a sales promotion message (promotion information) may can also be displayed. For example, a message like "you can get a discount of 30% now" or "you can get two free toners" may be displayed.

This message is periodically downloaded from the WWW site of the sales company described above, and hence the latest promotion information can always be displayed.

In this case, if the user requests purchase of the option device, he/she can directly order the article via the Internet, as described above.

More specifically, if the user selects the button to "purchase it now" in the above message, a window for inputting the delivery address of the article, a payment method, and the like is displayed to allow the user to make an order (T6).

Figure 3:
FIG. 3 is a view showing an input window to be displayed when customer information is input in making an order.
Figure 4:
FIG. 4 is a view showing an input window to be displayed when a payment method is input.

Note that FIG. 3 shows a window for inputting customer information in placing an order. FIG. 4 shows a window for inputting a payment method. In this embodiment, if the button ("YES" button) to "purchase it now" is pressed by the user in FIG. 2, a WWW browser is started on the background to display windows (FIGS. 3 and 4) for inputting information for purchase (name, contact address, payment method, and the like). Note that the windows in FIGS. 3 and 4 may also display information about the article to be purchased.

When all pieces of information required for the order are input and the order button is pressed, the order for the option device is transmitted to the sales company via the Internet.

In this case, since these pieces of order information are highly confidential, the computer encrypts all the pieces of information and transmits them to the shop server 2.

Note that the user can also request a service, e.g., the delivery of an estimate for purchase or catalogue other than an immediate purchase.

When the shop server 2 receives the order information, the sales company sells the necessary system apparatus (configuration) on the basis of the order information received from the user (U2).

The user then receives the purchased article configuration (option device), adds the article to the existing system apparatus, and changes the system configuration (T7).

The new configuration information of the system apparatus is then sent to the computer in the same manner as in step T1 (T8). At this time, the system apparatus configuration may be formed on the basis of the information obtained from a device via the network or manually selected/input by the user. This makes it possible to use the function based on the new system apparatus configuration.

The computer installs the optimized software on the basis of the new configuration information of the system apparatus (T9).

Detailed operation in the main operation in the sequence described above will be described in more detail.

Figure 6:
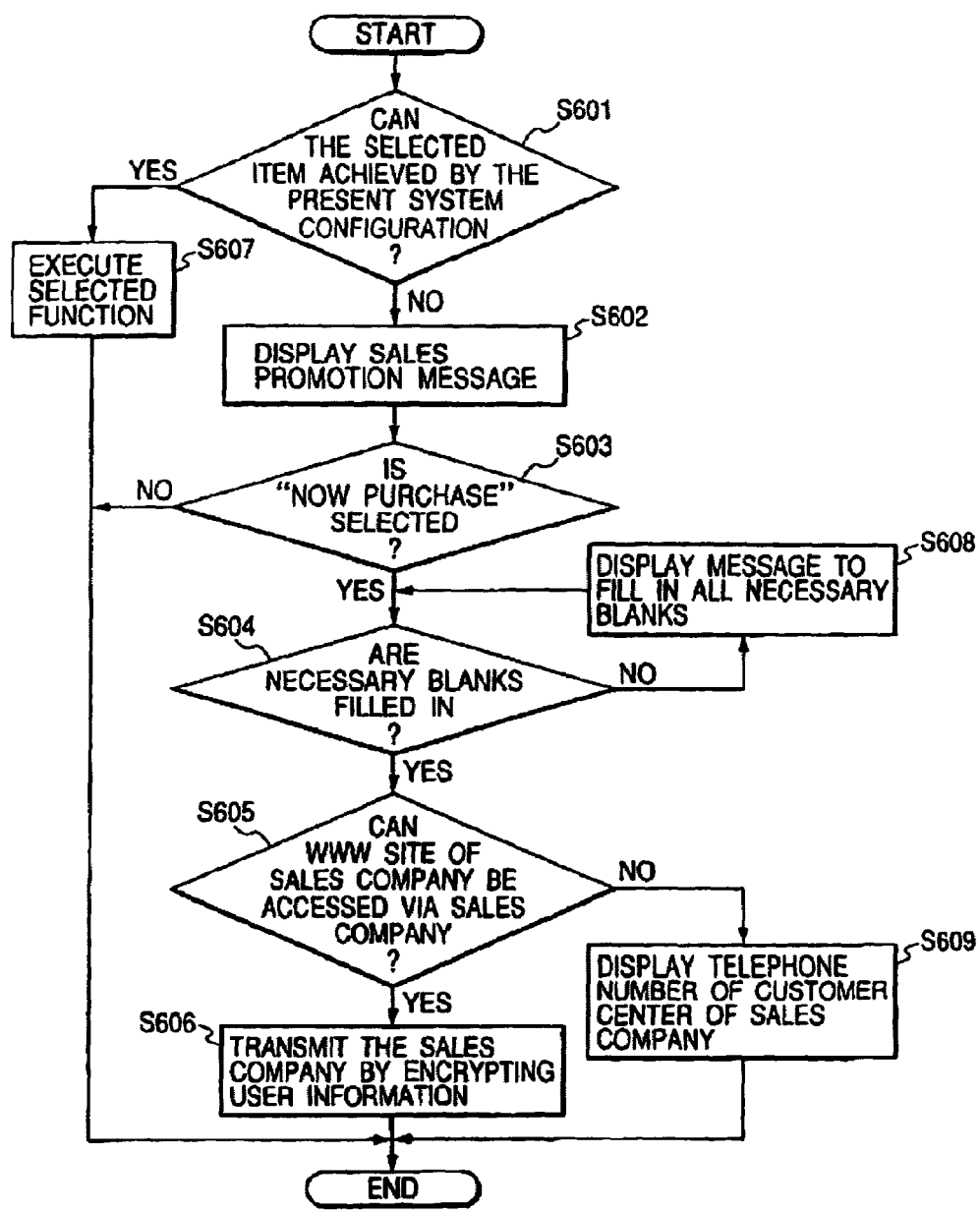
FIG. 6 is a flow chart showing operation to be done when a business promotion message is displayed.

Operation (T4 to T6) to be done to display a sales promotion message on the display unit of the client terminal 1 will be described in detail first with reference to the flow chart of FIG. 6.

First of all, it is checked whether the item selected by the user (the software function to be used) can be enabled (whether the function can be made available or active) in the current system configuration (S601). If it is determined that the item can be enabled (the function can be made available or active), the selected function is executed (or set) (S607).

If it is determined in step S601 that a function that cannot be enabled in the current system configuration is selected by the user, for example, a sales promotion message like the one shown in FIG. 2 is displayed (S602).

The message displayed at this time is information about a component required to execute the function, and includes, for example, the information of an option device required to use the function, the price, the delivery date, and promotion information.

In addition, sales information about the necessary component is simultaneously displayed. In this case, order information that allows the user to make an online order is displayed. For example, a purchase button for an option device like the one shown at the lower part of FIG. 2 is prepared.

It is then checked whether "purchase it now (NOW PURCHASE)" is selected (S603).

If "purchase it now" is not selected, the processing is terminated.

If it is determined in step S603 that "purchase it now" is selected, a window for allowing the user to make an online order is displayed. For example, an input window for user information like that shown in FIGS. 3 and 4 is displayed.

The user then inputs information for an order on such an input window.

Since all the information input here is required for the sale of the device, it is checked whether all the items are filled in (S604).

If there is a blank item, a message that prompts the user to input all the items (re-enter window) is displayed (S608), thereby prompting the user to input all the items.

When all the items are input, it is checked whether access can be made to the WWW site of the sales company via the Internet (S605).

In this case, the WWW site may not be accessed for the following reason. Client software for TCP/IP is not installed in the computer that the user is using. Even if such software is installed, access to a public line may be inhibited.

If it is determined that access cannot be made, a warning message indicating that the Intent cannot be accessed or the telephone number of the customer center of the sales company is displayed (S609).

If it is determined in step S605 that access can be made to the WWW site, the user information (customer information) input above is encrypted and transmitted to the sale company (S606), and the processing is terminated.

Operation to be performed when the client terminal 1 obtains the latest information of a component (the latest information to be displayed for sales promotion) from the shop server 2 will be described next with reference to the flow chart of FIG. 7.

First of all, in order to check whether the shop server 2 should be searched for the latest information, it is checked whether a predetermined revised time has elapsed (S701).

In this case, the intervals at which searches are made are set to five days as a default, but can be arbitrarily changed.

If it is determined that the predetermined revised time has elapsed and a search is made, it is checked whether the WWW site of the sales company can be accessed via the Internet (S702).

In this case, the WWW site may not be accessed for the following reason. Client software for TCP/IP is not installed in the computer that the user is using. Even if such software is installed, access to a public line is inhibited.

If it is determined that the WWW site cannot be accessed, an error message (warning message) clearly indicating that access cannot be made is displayed (S706).

If it is determined in step S702 that the WWW site can be accessed, the sales promotion information stored at a predetermined location in the site is checked to check whether there is any new sales promotion message in the WWW site of the sales company (S703).

If there is no new message, the processing is terminated.

If the information is renewed and new message exists, this information is downloaded into the personal computer via the Internet, thereby obtaining the new message (S704).

The downloaded information is stored at a location where access can be made from the software, and the business promotion message in the software is renewed (S705). The processing is then terminated.

Figure 8:
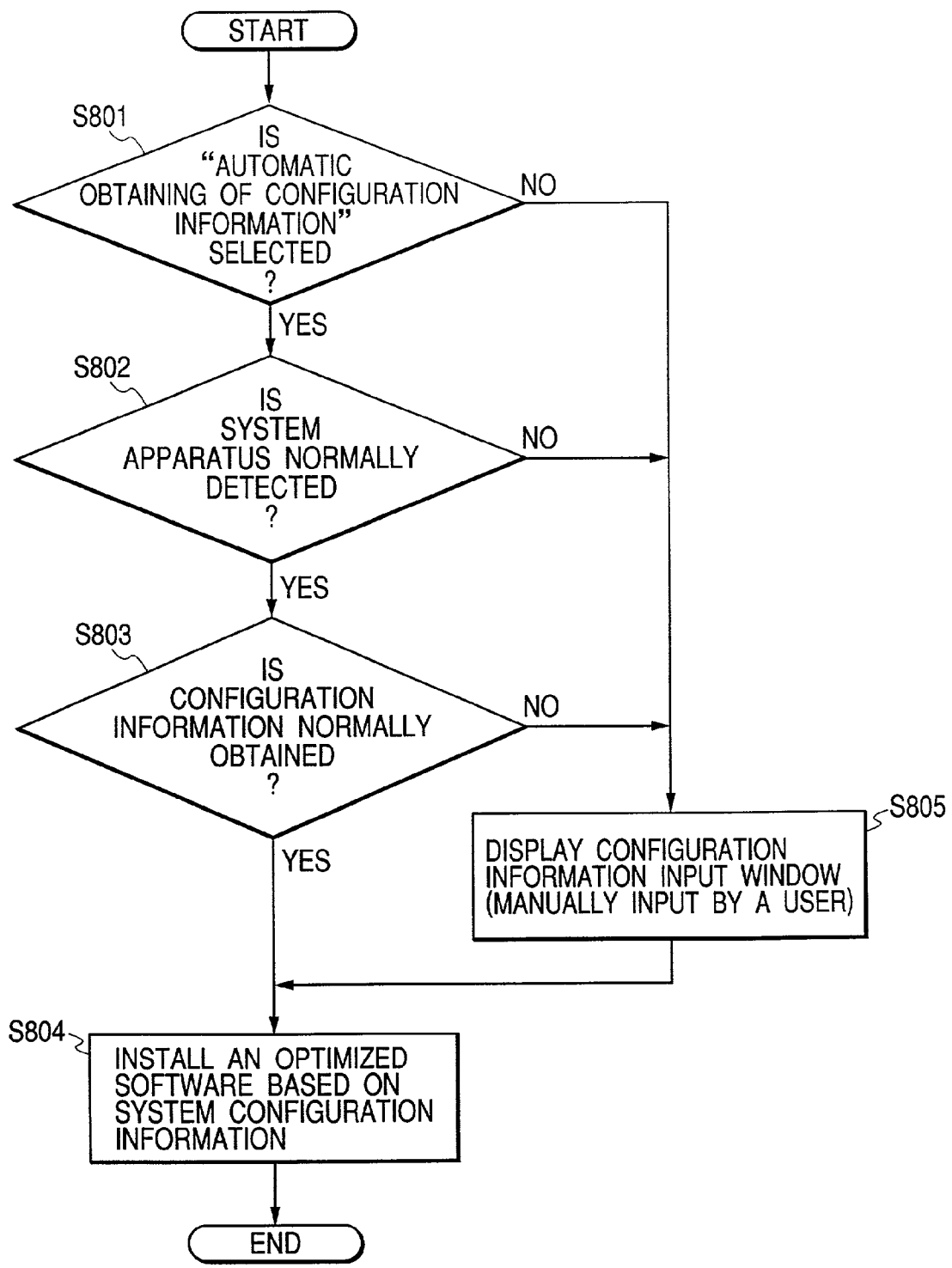
FIG. 8 is a flow chart showing operation to be done when system configuration information is obtained.

Operation (T1 and T2) to be performed when the client terminal 1 obtains the configuration information of the system apparatus will be described in detail next with reference to the flow chart of FIG. 8.

First of all, the computer of the client terminal 1 checks whether "automatic obtaining of configuration information" is selected (S801).

If it is not selected, a configuration information input window is displayed on the display unit, and the user manually inputs configuration information (S805). Optimized software is then installed on the basis of the input system configuration information (S804), and the processing is terminated.

If it is determined in step S801 that "automatic obtaining of configuration information" is selected, it is checked whether the system apparatus is normally detected on the network (S802).

If the system apparatus is not normally detected on the network, the configuration information input window is displayed on the display unit, and the user manually inputs configuration information (S805). Optimized software is then installed on the basis of the input system configuration information (S804), and the processing is terminated.

If it is determined in step S802 that the system apparatus is normally detected on the network, an attempt is made to obtain configuration information from the system apparatus.

It is then checked whether configuration information is normally obtained from the system apparatus (S803).

It configuration information cannot be normally obtained, the configuration information input window is displayed on the display unit, and the user manually inputs configuration information (S805). Optimized software is then installed on the basis of the input system configuration information (S804), and the processing is terminated.

If it is determined in step S803 that configuration information is normally obtained, optimized software is installed on the basis of the obtained system configuration information (S804), and the processing is terminated.

As described above, if part of the function of system apparatus installed in a computer such as a personal computer cannot be enabled because of lack of a component, the name, price, promotion information, and the like of a necessary option device are displayed to allow the user to quickly know what should be purchased to enable the component.

In setting the function of software, in particular, information about an option device required to use the function can be quickly obtained. This allows the user to easily determine which option device should be purchased.

This system is therefore very convenient for the user and stimulates user's appetite for purchase.

<Other Embodiments>

Figure 7:
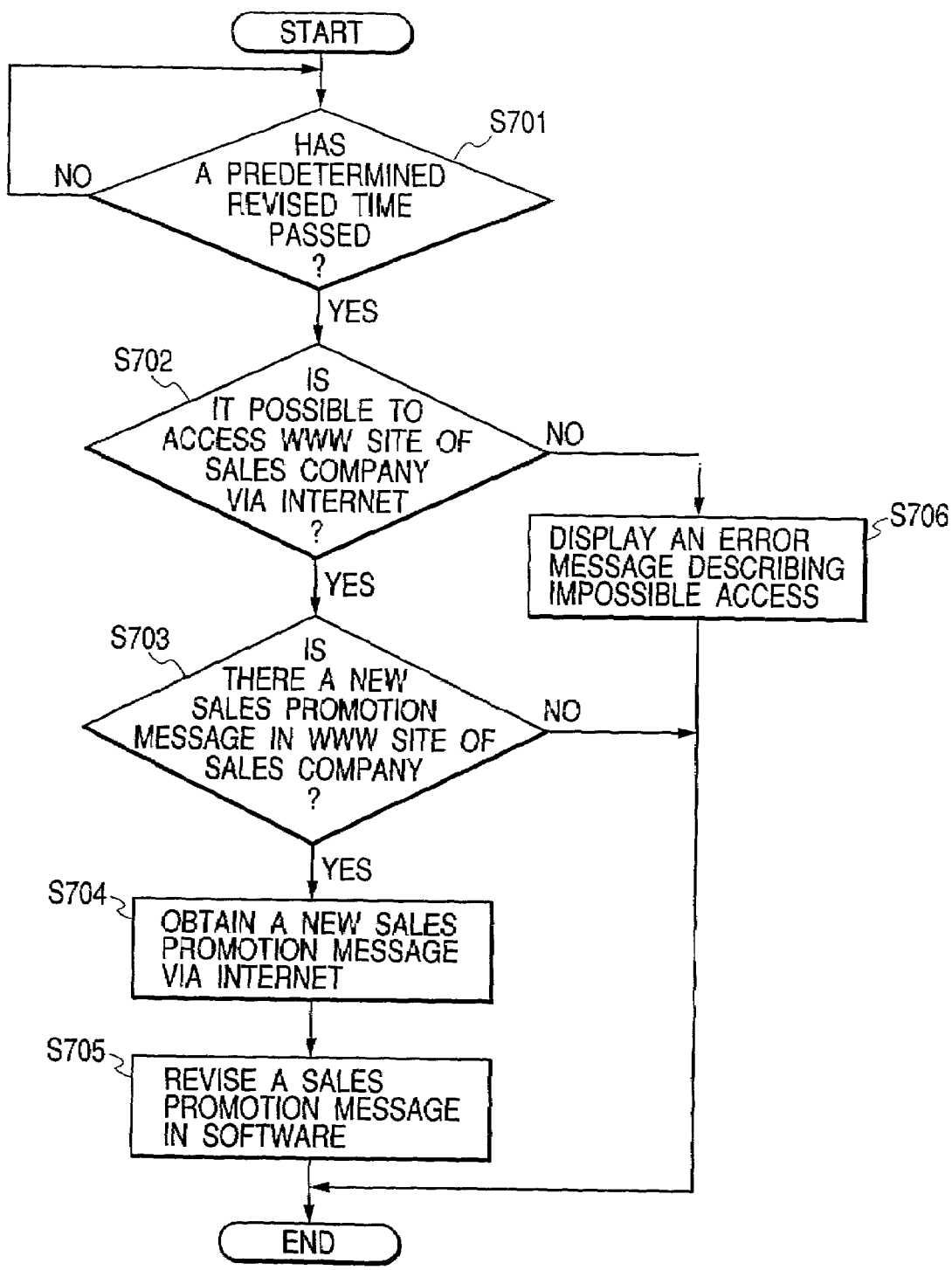
FIG. 7 is a flow chart showing operation to be done when the latest information is obtained from the WWW site of a sales company.

According to the above embodiment, as shown in FIG. 7, inquiries about the latest information are made to the shop server at predetermined time intervals. If there is new information, the information is obtained in advance. However, the present invention is not limited to such a form.

Figure 9:
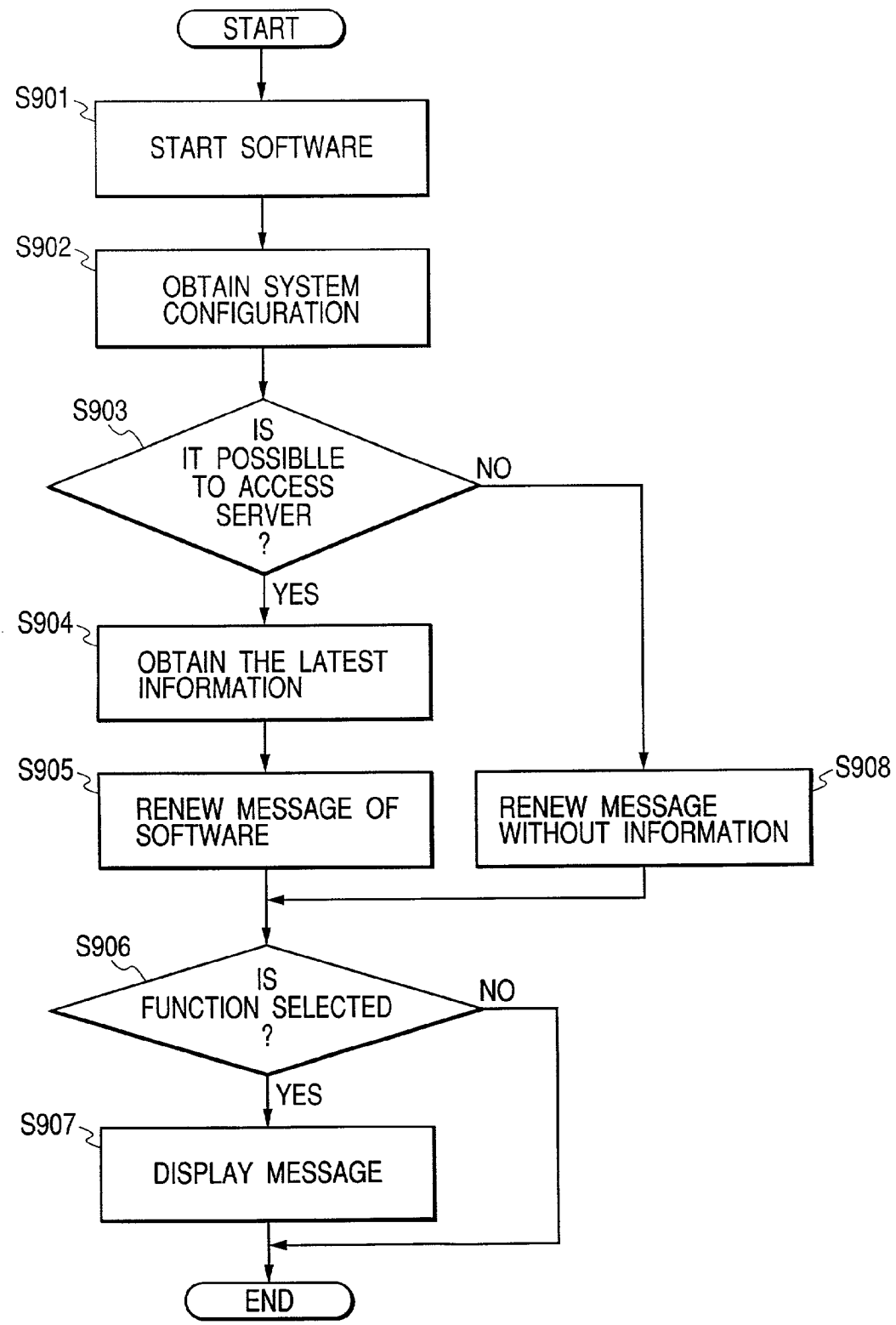
FIG. 9 is a flow chart showing processing in the second embodiment.

For example, when software is started, an inquiry may be automatically made to the shop server 2. When, for example, a printer driver for making printer settings like those shown in FIG. 2 is started, an inquiry about the latest information may be automatically made to the shop server 2 to check the presence/absence of the latest information. FIG. 9 is a flow chart showing a procedure in the second embodiment. First of all, when software (e.g., a property for printer setting) is started (S901), the current system configuration is obtained (S902). It is checked in step S903 whether the server can be accessed. If YES in step S903, the server is informed of the current system configuration to obtain the latest information (option information, business promotion information, and the like) corresponding to the type of device in step S904. The message in the software is then renewed on the basis of the obtained latest information. If the server cannot be accessed, a message indicating that no latest information could be obtained is set in the software in step S908. It is then checked in step S906 whether any function that can be set/enabled in the current system configuration is selected by the user. If such a function is selected, a message corresponding to the function (the message set in step S905 or the message set in step S908 if no initial data could be obtained from the server) is displayed in step S907. Note that information for making an order is contained in this message to allow the user to make an order as in the first embodiment.

In the above embodiment, any function that cannot be used in the current system configuration is grayed out. However, the present invention is not limited to this. Such function may be displayed in another display form, e.g., displayed in a color other than gray. For example, function items which can be used in the current system configuration are displayed in black, function items which cannot be used in the current system configuration and for which information for the use of the functions could be obtained from the shop server 2 are displayed in blue, and function items which cannot be used in the current system configuration and for which information about option devices could not be obtained are displayed in red. This makes it possible to identify the respective function items as function items which can be used, items which cannot be used and have information about option devices, and items which cannot be used and for which information about option devices could not be obtained. The user can therefore easily browse information about option devices when he/she wants to obtain it.

As has been described above, according to the present invention, the user can easily obtain information about a component required to enable the function of software to be used. In addition, since the latest information can be obtained, this system is very convenient for the user.

Furthermore, since the user can quickly browse the information of a necessary component, the user's appetite for purchase is stimulated. This makes it possible for the sales company to efficiently promote sales.

What is claimed is:

1. An information processing system that executes computer program for setting functions to be executed by a device, wherein the computer program causes the information processing system to execute the steps of:

obtaining configuration information of the current device;

displaying a setting window for setting functions to be executed by the current device, the setting window being displayed based on the obtained configuration information, wherein the displayed setting window includes graphical items associated with one or more functions that the current device can perform and another graphical items associated with one or more functions that the current device cannot perform; and generating control commands for driving the current device in accordance with the functions set in the setting window, wherein when one of said another graphical items associated with functions that the current device cannot perform is selected on the setting window by the user, in said step of displaying the setting window, it is displayed information about a further device component required to enable the selected function of the selected another graphical item.

2. A system according to claim 1, wherein the computer program causes the information processing system to further execute the step of obtaining the information about the further component from a shop server via a network.

3. A system according to claim 2, wherein the information about the further component is obtained by periodically making inquiries to the shop server.

4. A system according to claim 2, wherein the information about the further component is obtained by making an inquiry to the shop server when the setting window is activated.

5. A system according to claim 1, wherein the information about the further component includes sales information about the further component required to enable the selected function.

6. A system according to claim 5, wherein the computer program causes the information processing system to further execute the step of ordering an article on the basis of the sales information of the further component.

7. A system according to claim 1, wherein the configuration information of the current device is obtained automatically.

8. A system according to claim 1, wherein the obtained configuration information of the current device is input by a user.

9. A system according to claim 1, wherein the computer program is a printer driver program.

10. An information processing method for setting functions to be executed by a device, the method comprising:

an obtaining step of obtaining configuration information of the current device;

a display step of displaying a setting window for setting functions to be executed by the current device, the setting window being displayed based on the obtained configuration information, wherein the displayed setting window includes graphical items associated with one or more functions that the current device can perform and another graphical items associated with one or more functions that the current device cannot perform; and a generating step for generating control commands for driving the current device in accordance with the functions set in the setting window, wherein when one of said another graphical items associated with functions that the current device cannot perform is selected on the setting window by the user, in said step of displaying the setting window, it is displayed, information about a further device component required to enable the function of the selected another graphical item.

11. A method according to claim 10, wherein the computer program causes the information processing system to further execute an information obtaining step of obtaining information about the further component from a shop server via a network.

12. A method according to claim 11, wherein in the information obtaining step, the information about the further component is obtained by periodically making inquiries to the shop server.

13. A method according to claim 11, wherein in the information obtaining step, the information about the further component is obtained by making an inquiry to the shop server when the setting window is activated.

14. A method according to claim 10, wherein the information about the further component includes sales information about the further component required to enable the selected function.

15. A method according to claim 14, further comprising the ordering step of ordering an article on the basis of the sales information of the further component.

16. A computer readable storage medium storing a computer program including program codes for setting functions to be executed by a device, which can be executed by a computer, the computer program comprising:

a program code for the obtaining step of obtaining configuration information of the current device;

a program code for the display step of displaying a setting window for setting functions to be executed by the current device, the setting window being displayed based on the obtained configuration information, wherein the displayed setting window includes graphical items associated with one or more functions that the current device can perform and another graphical items associated with one or more functions that the current device cannot perform; and a program code for the generating step for generating control commands for driving the current device in accordance with the functions set in the setting window, wherein, when one of said another graphical items associated with functions that the current device cannot perform is selected on the setting window by the user, in said step of displaying the setting window, it is displayed, information about a further device component required to enable the function of the selected another graphical item.

* * * * *